(12) United States Patent
Srivastav et al.

(10) Patent No.: US 9,413,798 B2
(45) Date of Patent: Aug. 9, 2016

(54) METHOD AND SYSTEM FOR VIDEO-ON-DEMAND (VOD)

(71) Applicant: Cisco Technology, Inc., San Jose, CA (US)

(72) Inventors: Vivek Shankar Srivastav, Suwanee, GA (US); Timothy C. Richards, Cumming, GA (US)

(73) Assignee: Cisco Technology, Inc., San Jose, CA (US)

( * ) Notice: Subject to any disclaimer, the term of this patent is extended or adjusted under 35 U.S.C. 154(b) by 190 days.

(21) Appl. No.: 13/901,623

(22) Filed: May 24, 2013

(65) Prior Publication Data

US 2014/0351834 A1    Nov. 27, 2014

(51) Int. Cl.
| | | |
|---|---|---|
| *H04L 29/06* | (2006.01) | |
| *H04N 21/41* | (2011.01) | |
| *H04N 21/4227* | (2011.01) | |
| *H04N 21/472* | (2011.01) | |

(52) U.S. Cl.
CPC ........ *H04L 65/4084* (2013.01); *H04L 65/1069* (2013.01); *H04N 21/4126* (2013.01); *H04N 21/4227* (2013.01); *H04N 21/47202* (2013.01)

(58) Field of Classification Search
CPC ............... H04N 21/2543; H04N 21/25875; H04N 21/4126; H04N 21/4532; H04N 21/47202; H04N 7/173; H04N 21/00; H04N 21/4227; H04N 21/222; H04N 21/25841; H04N 21/44209; H04N 21/6338; H04N 21/6587; H04N 21/2393; H04N 21/4753; H04N 21/6181; G06F 21/602; H04W 12/04; H04W 12/06; H04W 12/08
See application file for complete search history.

(56) References Cited

U.S. PATENT DOCUMENTS

| | | | |
|---|---|---|---|
| 6,757,907 B1 * | 6/2004 | Schumacher et al. .......... 725/87 |
| 2007/0086372 A1 * | 4/2007 | Lee .......................... G06F 21/10 |
| | | | 370/328 |
| 2007/0143457 A1 * | 6/2007 | Mao ....................... H04L 63/102 |
| | | | 709/223 |
| 2010/0071014 A1 * | 3/2010 | Brown et al. .................. 725/110 |
| 2011/0010741 A1 * | 1/2011 | Liao et al. ........................ 725/51 |
| 2011/0191811 A1 * | 8/2011 | Rouse .................... H04N 7/173 |
| | | | 725/93 |
| 2011/0225640 A1 * | 9/2011 | Ganapathy et al. ................ 726/8 |
| 2012/0096499 A1 * | 4/2012 | Dasher ............... H04N 21/4223 |
| | | | 725/87 |
| 2012/0102531 A1 * | 4/2012 | Schlack ............. H04N 21/4227 |
| | | | 725/93 |
| 2012/0266200 A1 * | 10/2012 | Dasher et al. .................... 725/93 |
| 2012/0272261 A1 * | 10/2012 | Reynolds ............. H04N 21/222 |
| | | | 725/30 |
| 2013/0091284 A1 * | 4/2013 | Rothschild .............. G06F 3/067 |
| | | | 709/226 |
| 2013/0145409 A1 * | 6/2013 | Vince ................. H04N 21/4227 |
| | | | 725/93 |
| 2014/0281559 A1 * | 9/2014 | Trachtenberg et al. ....... 713/178 |
| 2014/0317663 A1 * | 10/2014 | Keum et al. ..................... 725/50 |

* cited by examiner

*Primary Examiner* — Hai V Tran
(74) *Attorney, Agent, or Firm* — Merchant & Gould P.C.

(57) ABSTRACT

Providing video-on-demand (VOD) content to a subscriber may be disclosed. First, a request for a VOD session may be received from a companion device. Next, in response to the received request for the VOD session, a catalog of VOD content may be sent to the companion device. A selection of VOD content listed in the catalog of VOD content may then be received. A digital transport adaptor (DTA) corresponding to the received request for the VOD session may be identified. Next, the VOD session may be setup with the identified DTA and the selected VOD content may be streamed to the identified DTA.

24 Claims, 9 Drawing Sheets

METHOD AND SYSTEM FOR VIDEO-ON-DEMAND (VOD)

TECHNICAL FIELD

The present disclosure relates generally to video-on-demand.

BACKGROUND

Video-on-demand (VOD) systems allow users to select and watch video content on demand. Television (TV) VOD systems either stream content through a Set Top Box (STB), a computer, or other device, allowing viewing in real time, or downloading to a device for viewing at any time. Cable television providers offer both VOD streaming, including pay-per-view, and free content allowing users to buy or selects a movie or television program for viewing.

BRIEF DESCRIPTION OF DRAWINGS

The accompanying drawings, which are incorporated in and constitute a part of this disclosure, illustrate various embodiments of the present disclosure. In the drawings.

DETAILED DESCRIPTION

Overview

Figure 1:
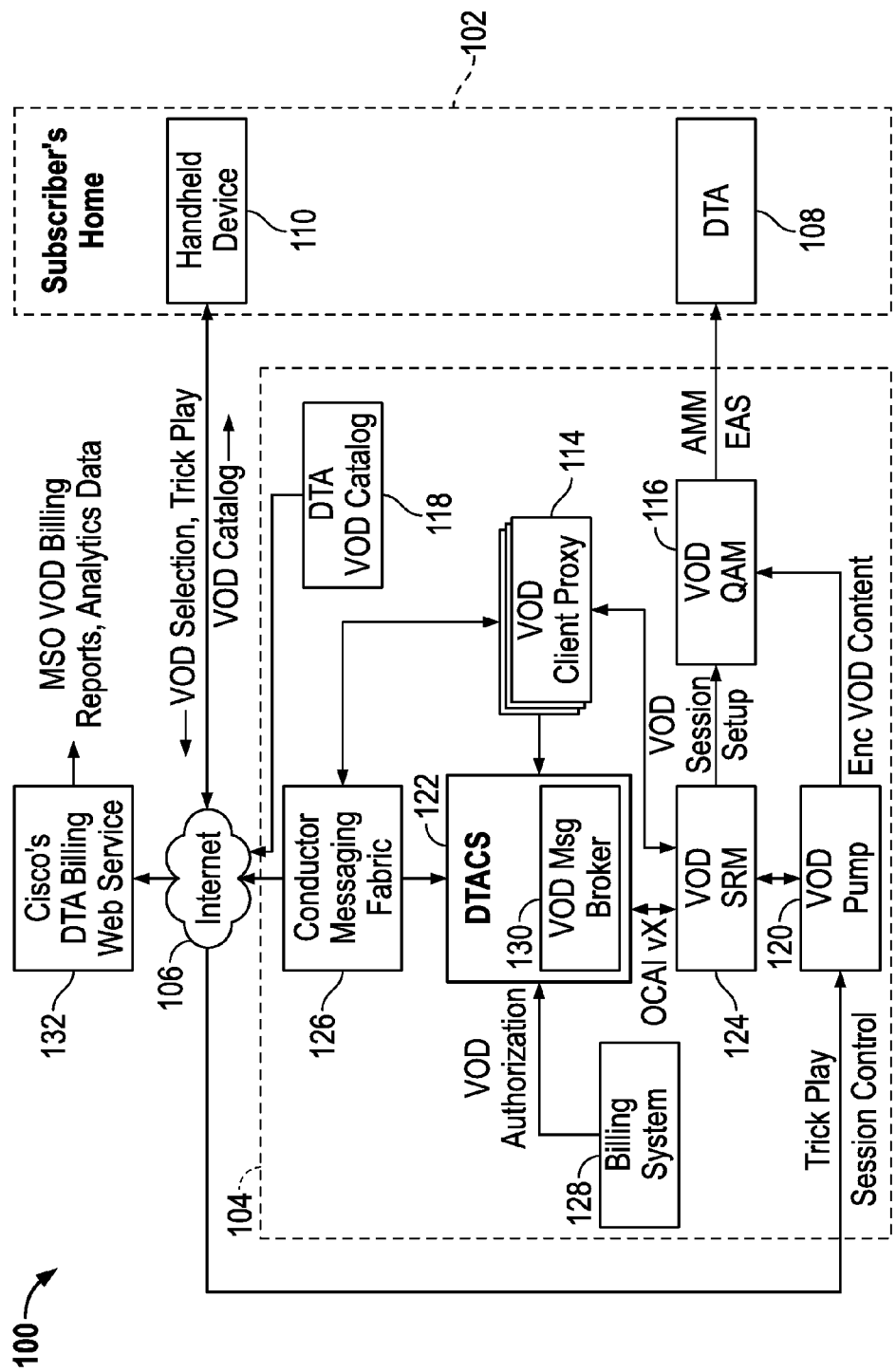
FIG. 1 is a diagram illustrating a VOD system.

Providing video-on-demand (VOD) content to a subscriber may be disclosed. First, a request for a VOD session may be received from a companion device. Next, in response to the received request for the VOD session, a catalog of VOD content may be sent to the companion device. A selection of VOD content listed in the catalog of VOD content may then be received. A digital transport adaptor (DTA) corresponding to the received request for the VOD session may be identified. Next, the VOD session may be setup with the identified DTA and the selected VOD content may be streamed to the identified DTA.

Both the foregoing overview and the following example embodiment are examples and explanatory only, and should not be considered to restrict the disclosure's scope, as described and claimed. Further, features and/or variations may be provided in addition to those set forth herein. For example, embodiments of the disclosure may be directed to various feature combinations and sub-combinations described in the example embodiment.

Example Embodiments

The following detailed description refers to the accompanying drawings. Wherever possible, the same reference numbers are used in the drawings and the following description to refer to the same or similar elements. While embodiments of the disclosure may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following detailed description does not limit the disclosure. Instead, the proper scope of the disclosure is defined by the appended claims.

VOD content may be provided to a subscriber (e.g. a user) via a digital transport adaptor (DTA) located, for example, at the subscriber's home. A VOD session with the DTA may be established using a companion device. A companion device may have a VOD application configured to interact with a client proxy service via the Internet, for example. The VOD application may allow a subscriber to login to the client proxy service. The client proxy service may identify a headend in a multi system operator (MSO). The client proxy service may configure the headend to stream the VOD content to the DTA. The client proxy service may further identify a catalog of VOD contents based on the subscriber eligibility and availability of contents with the identified headend. The client proxy service may send the catalog to the companion device to be displayed on the VOD application.

The subscriber may select VOD content from the catalog. The VOD application may send a response to the client proxy service indicating the selected VOD content and an identity of the DTA where the VOD content is to be streamed. The client proxy service may send instructions to the headend to force tune the DTA to a selected frequency. The headend may stream the selected VOD content to the DTA on the selected frequency. In addition, the subscriber may also request and receive trick play for the selected VOD content on the VOD application.

FIG. 1 a diagram illustrating an example embodiment of a VOD system 100 that may provide VOD content to a subscriber in, for example, a cable television network. VOD system 100 may allow the subscriber to select and avail VOD content on demand. VOD system 100 may include a subscriber's home 102 connected to a multi system operator (MSO) 104. Subscriber's home 102 may be connected to MSO 104 through one or more communication mediums/networks, such the Internet 106 for example, and/or a hybrid fiber coax (HFC) cable system. MSO 104 may be configured to deliver VOD services to subscriber's home 102 through the one or more communication mediums/networks.

Subscriber's home 102 may include a DTA 108 and a hand held device 110. Although in FIG. 1, subscriber's home 102 is shown to include only one DTA 108, subscriber's home 102 may include multiple DTAs. Similarity, subscriber's home 102 may include multiple handheld devices. Subscriber's home 102 may further include one or more display devices, such as a television (TV) that may be connected and configured to receive digital signals from DTA 108.

Handheld device 110 may comprise, but is not limited to, a smartphone, a tablet device, a handheld device, a personal computer (PC), a minicomputer, a personal digital assistant, a personal media device (PMD), or other computing device. Although VOD system 100 is described with respect to DTA 108, VOD system 100 may be implemented on other customer premise equipment (CPE) and host devices located within subscriber's home 102. As an example, the CPE may comprise a set top box (STB), a television, a cable modem (CM), or an embedded multimedia terminal adaptors (eMTAs).

MSO 104 may include a client proxy service 114, a quadrature amplitude modulation (QAM) device 116, a catalog 118, a video pump 120, a digital transport adaptor control system (DTACS) 122, a session resource manager (SRM) 124, a messaging infrastructure 126, and a billing system 128. DTACS 122 may include a message broker 130. MSO 104 may be connected to web services 132 through the network (e.g. Internet 106.) MSO 104 may further include one or more content sources (not shown), such as third party data source, CD-ROM, mass storage device (e.g. RAID system), etc., where VOD content may be stored and from where VOD content may be sourced.

QAM 116 may refer a device/application configured to enable modulation schemes used for sending signals over cable networks. Such modulation scheme might use any constellation level (e.g. QPSK, QAM-16, QAM-64, QAM-256 etc.) depending on details of a cable network. QAM 116 may also refer to a physical channel modulated according to the aforementioned schemes. Video pump 120 may refer to a computer or a server that may be configured to stream VOD content via QAM 116 and DTA 108 to subscriber's home 102.

DTASC 122 may be an application to manage DTA 108. SRM 124 may include a device or application configured to align headend resources to establish the VOD session with subscriber's home 102. SRM 124 may include an algorithm for bandwidth allocation for the VOD session. Messaging infrastructure 126 may be a device/application that may be configured to enable one or more application in MSO 104 to preview, publish, search, and manage messages to a targeted device/application. In addition, messaging infrastructure 126 may allow MSO 104 to publish real time messages to a group of subscribers or a specific subscriber device, such as DTA 108. Message broker 130 may be an application for message validation, message transformation and message routing. Message broker 130 may mediate communication among different applications of MSO 104 minimizing a mutual awareness that applications should have of each other in order to be able to exchange messages.

Catalog 118 may be a device/application configured to generate a catalog of VOD content. The catalog of VOD content may be generated based on the subscriber's eligibility, availability of contents, and ability of a headend/QAM 116 to stream the contents to the subscriber. Billing system 128 may be a device/application configured to generate bills for subscribers based on VOD contents streamed to the subscribers.

DTA 108 may comprise a universal digital transport adapter (uDTA), a convertor box, or a television tuner that may receive digital television (DTV) transmissions and convert the digital signal into an analog signal that may be received and displayed on an analog display device. As an example, DTA 108 may only be able to communicate in a one-way communications mode with MSO 104. The one-way communications mode may comprise messaging (and content) consumption by DTA 108 received from only a downstream data path, such as from QAM 116. As another example, DTA 108 may only be configured to communicate via consumption of an in-band down-stream data path. DTA 108 may not be able to communicate with external devices, such as a remote control or a smart television. Due to these communications characteristics, DTA 108 may comprise a muted device since DTA 108 may not be able to accept input in the form of messaging and content from the network. In addition, DTA 108 may be unable to respond or acknowledge receipt of the input from the network, much less possessing the capacity to initiate any type of messaging back or upstream to network resident entities such as network controllers, billing back-offices, etc.

VOD services may enable a subscriber to select a piece of VOD content to be delivered to subscriber's home 102. Therefore, subscriber's home 102 may need to be enabled to forward messages from subscriber's home 102 to MSO 104. More specifically, to access VOD service on DTA 108, subscriber's home 102 may be able to forward messages to MSO 104 (e.g. up-stream communication). As an example, the selections made by the subscriber for a piece of VOD content may be conveyed to MSO 104. Because VOD may need two-way communication, DTA 108 by itself may not be able to support a VOD session.

Consistent with the embodiments of the disclosure, VOD system 100 may enable VOD service delivery on one-way devices like DTA 108. The VOD services may be provided to DTA 108 using a companion device, such as handheld device 110. The companion device may be configured to interact with MSO 104 and provide an up-stream communication path from subscriber's home 102 to MSO 104 via the network (e.g. Internet 106.) The companion device may further be configured to negotiate with VOD back-office devices, such as QAM 116, client proxy services 114, DTACS 122, billing system 128, web services 132, SRM 124, etc., using the up-stream communication path.

To access video on demand on DTA 108, subscriber's home 102 may be enabled to forward the selection of the VOD content made by the subscriber using the companion device to MSO 104. By itself, DTA 108 may not have an ability to communicate upstream (i.e. reverse path) with a headend (HE), such as QAM 116, which may be configured to provide VOD services. The upstream path from subscriber's home 102 to the HE may be provided, for example, using the companion device. The companion device may include a VOD application for selecting the VOD content and control the VOD session. The messages for the VOD content selection and VOD session control may be propagated upstream via the network (Internet 106.) A cloud based service, may provide support for transmission of billable data from a VOD solution provider to an incumbent billing system.

The companion device may communicate with MSO 104 independent of a down-stream path from QAM 116 to DTA 108. As an example, the companion device may be may be an internet protocol (IP) enabled handheld device 110 (such as tablet computer) and configured to communicate with MSO 104 using the Internet 106. Handheld device 110 may be used to select and manage the VOD session, which may, subsequently, be streamed to DTA 108. Handheld device 110 may also include a computing device that may be configured to interact with MSO 104, more specifically client proxy services 114, using the Internet 106.

Consistent with embodiments of the disclosure, VOD system 100 may provide mechanisms to send authorization management messages (AMM) and emergency alert messages (EAS) to DTA 108. As an example, MSO 104 may be configured to provide the AMM and the EAS when QAM 116 is used to deliver the VOD services to subscriber's home 102. QAM 116 may be network resident multiplexing equipment, and configured to deliver VOD services in addition to providing DTA 108 signaling and broadcast only content. In VOD system 104, a presence or absence of broadcast sessions on QAM 116 may be used as a trigger or activation for supplying DTA 108, AMM and EAS messages.

MSO 104 may be configured to provide a mechanism to identify and model headend devices, such as QAM 116, that are participating in providing the VOD service for DTA 108. The mechanism to identify and model the headend devices that are participating in providing the VOD service to DTA 108 may be provided using the up-stream communication capability of the companion device. MSO 104 may further provide mechanism to administer in-band broadcast sessions on the identified headend devices to establish necessary triggering/activation constructs. The triggering/activation constructs may result in enabling DTA 108 to continue to receive in-band AMM and EAS data.

In addition, MSO 104 may be configured to provide a mechanism to signal session end notification to the headend devices, such as QAM 116, and DTA 108. Since there is no up-stream signaling from DTA 108, at an end of a given VOD session, session end notification may be provided to QAM 116 using the up-stream commutation capabilities of the companion device. The session end notifications, by the companion device, may be provided from the SRM 124 back to DTA 108 control plane. The session end notifications may act as a trigger to signal DTA 108 to relinquish an allocated bandwidth upon which the VOD session was established. Upon receiving a de-allocation event (i.e. loss of content), DTA 108 may exit out of the allocated frequency.

Consistent with embodiments of the disclosure, MSO 104 may be configured to provide a mechanism to enable multiple subscribers to simultaneously watch the same VOD session. As an example, if a VOD content is purchased by subscriber-1, subscriber-1 may want to watch the VOD content along with subscriber-2 and subscriber-3. MSO 104 may simultaneously stream the VOD content on DTAs associated with the subscriber-2 and subscriber-3, whether these other DTA devices also reside within MSO 104 network. Embodiments of the disclosure may also enable the subscriber to initiate sharing the VOD session on multiple DTAs (for scenarios where there are multiple DTAs associated with a subscriber's account). These multiple DTAs, which may share the VOD session, may reside in different service groups or even different headends as long as video pump 120 is same. The sharing of the VOD session content on multiple DTAs may also be referred to as a surrogate VOD session.

Consistent with embodiments of the disclosure, VOD system 100 may be configured to provide a mechanism to facilitate private messaging (IM) services between the subscribers. As an example, using an infrastructure that may facilitate presence and sharing (such as conductor-messaging infrastructure), IM and buddy list integration may be provided. The subscribers may be able to share asset identification criteria (i.e. asset-ID) with each other and recommend VOD assets to buddies.

Figure 2A:
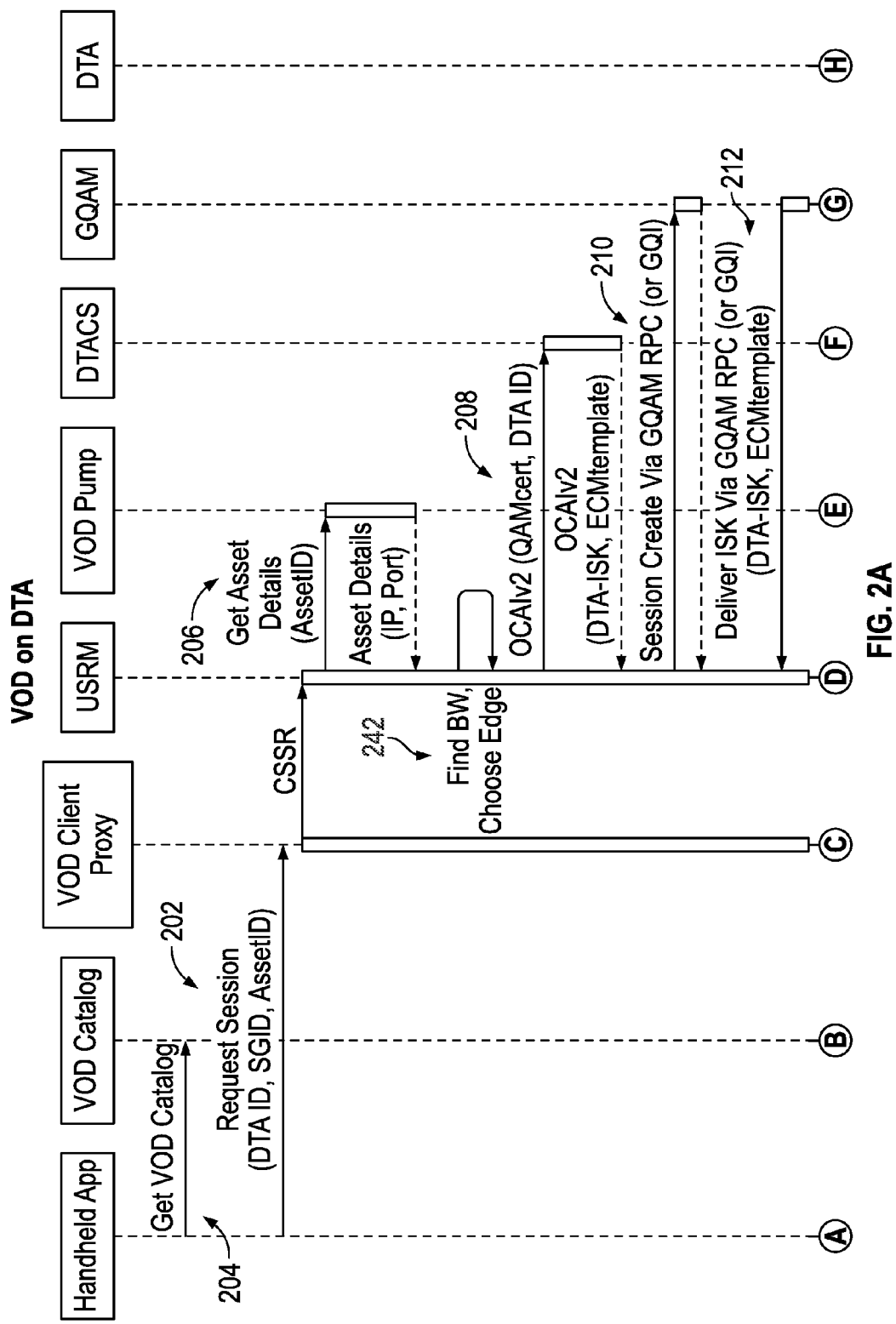
FIGS. 2A and 2B show a sequence diagram for establishing a VOD session on a digital transport adaptor (DTA)
Figure 2B:
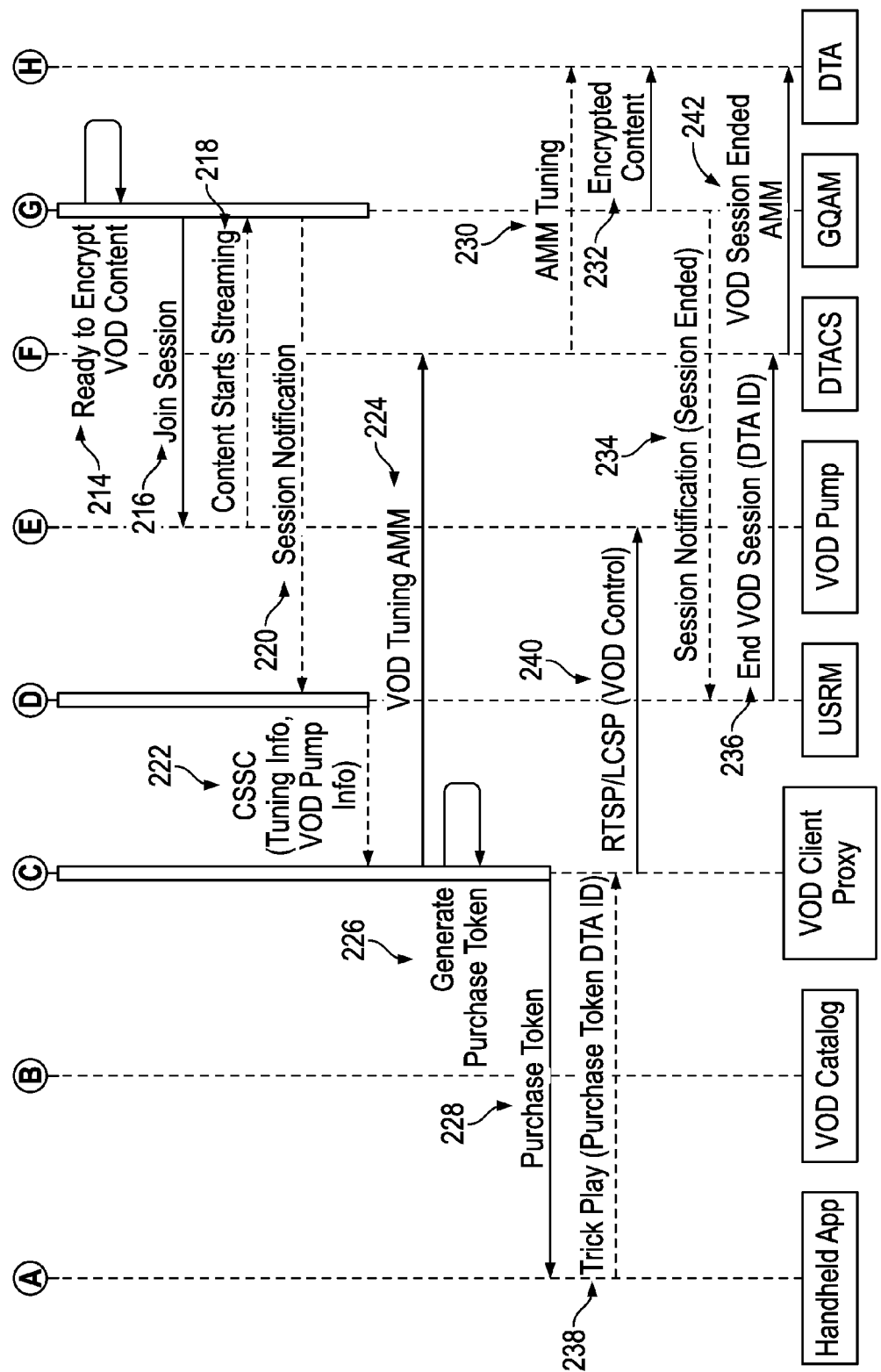

FIGS. 2A and 2B illustrate a sequence diagram 200 for VOD session establishment. As an example, sequence diagram 200 illustrates exchange of messages to establish a VOD session between subscriber's home 102 and MSO 104. At stage 202 of FIG. 2A, a subscriber, using a VOD application running on handheld device 110, may initiate a VOD session with MSO 104. The initiation may include sending a session setup request 202 using the VOD application. Session setup request 202 may include subscriber identification, such as login credentials. Session setup request 202 may further include DTA 108 identification (DTA ID), service group identification (SGID), and an asset ID. Session request 202 may be received at client proxy service 114.

Client proxy service 114, after receiving the session setup request 202, may communicate with DTACS 122 and verify that the subscriber or DTA 108 is authorized for the VOD service. If verification fails, the VOD application may be notified that the subscriber is not authorized for the VOD services. DTASC 122 may verify the authorization of the subscriber by communicating the subscriber's login credentials or DTA ID with billing system 128. Billing system 128, after verifying the login credentials or DTA ID, may issue a transaction message to DTASC 122 authorizing the subscriber for the VOD services. Billing system 128, in the transaction message to DTASC 122, may include VOD packages opted by the subscriber. DTASC 122 may confirm client proxy service 114 of the subscriber's authorization.

After receiving the session setup request 202, and as a function of VOD feature enablement, appropriate MSO 104 may identify appropriate heandend (HE) resources/services with which the VOD application may interact in order to obtain catalog and VOD asset access information. Client proxy service 114 running on a cloud server may broker on behalf of the VOD application running on handheld device 110 to facilitate the identification and, subsequent, pairing of the VOD application with the appropriate HE. The identification process may also be based on a geocode-mapping scheme utilizing MSO 104 service identifiers as identification criteria. Alternatively, the subscriber may provision these settings manually in the VOD application.

At stage 204, the handheld application may also send a request for a catalog of VOD content to catalog 118. Client proxy service 114 may initiate a process to get the catalog of contents available to the subscriber after authorization of the subscriber. The catalog may include a list of VOD content available to the subscriber. The catalog may be generated based on the VOD packages availed by the subscriber. As an example, client proxy service 114 may retrieve the catalog from catalog 118.

Client proxy service 114 may send the catalog to handheld device 110 through the Internet 106. Handheld device 110 may be configured to display the catalog on the VOD application. The subscriber may select a piece of VOD content from the catalogue using the VOD application. The selection made by the subscriber may be communicated by handheld device 110 to client proxy service 114 through the Internet 106.

Consistent with embodiments of the disclosure, the VOD application may also be enabled to list past purchases made by the subscriber and allow the subscriber to select a previously purchased VOD content. The VOD application may also be integrated with an instant-messaging capability that may allow subscribers to manage their respective roster as well as share their VOD asset ID with buddies registered within their roster. In addition, if the subscriber has more than one DTA, the VOD application may display a list of the DTAs associated with the subscriber login credentials. The VOD application then may allow the subscriber to choose a target DTA from the list. The VOD application, upon the subscriber selection of the target DTA, may notify client proxy service 114 of the asset ID, the DTA identifier and the VOD service group of the target DTA.

Consistent with embodiments of the disclosure, the authorization of the subscribers credentials may results in generation of a DTA specific '128 bit symmetric encryption and decryption key' designated DTA-ISK. The DTA-ISK may be similar to a typical VOD individual session key (ISK). The DTA-ISK key may be delivered to DTA 108 using the AMM message. DTA 108 may install the DTA-ISK key into its system on a chip (SOC) and use it for the VOD content decryption. In absence of VOD service authorization, DTASC 122 may pre-generate DTA-ISK for all DTA devices associated with the subscriber.

At stage 226, client proxy services 114 may generate a unique purchase token for the asset ID requested. The purchase token may be similar in construct to the DTA identifier (i.e. a MAC address). The purchase token, including the purchase token's expiry date time and other metadata, may be returned to the VOD application. The VOD application may store the purchase token either locally or within a cloud resident shared storage device. The purchase token may be used by the VOD application to request the VOD session. The subscriber may share the purchase token on multiple handheld devices or request that the VOD content be streamed to another DTA. The subscriber may also share this purchase token with other buddies contained within her roster using the IM capability within the VOD application to allow them to co-watch the VOD session. In addition, client proxy service 114 may expose a service interface for the VOD application to retrieve its list of purchase tokens.

Client proxy service 114, after receiving session setup request 202, and after successful verification, may use a digital storage media command control (DSMCC) interface with SRM 124 to make a Client Session Setup Request (CSSR). Client proxy service 114 may via CSSR pass the SGID, purchase token and the AssetID to SRM 124. In addition, pursuant to establishing the VOD session, at stage 206, SRM 124 may obtain video pump 120 IP address and port information from the VOD server using the AssetID.

At stage 242, client proxy service 114 may determine a bandwidth for establishing the VOD session. In addition, client proxy service 114 may determine an appropriate edge such as headend and a QAM 116 for the VOD session. The edge may be determined based on a location of subscriber's home 102 or handheld device 110. The mechanism for determining the edge will be described in greater detail below.

After receiving the CSSR, SRM 124 may determine if the VOD session is to be encrypted. If the VOD session is to be encrypted, then SRM 124, may at stage 208, communicate with the DTACS 122 over an open conditional access interface (such as OCAI v2) with the purchase token to request for an individual session key (ISK) for the VOD session. In turn, DTACS 122 may communicate with client proxy service 114 to obtain DTA 108 identifier associated with the presented purchase token. Client proxy service 114 then may return the DTA identifier to DTASC 122. DTACS 122 may respond to SRM 124 with the DTA-ISK associated with DTA 108.

At stage 210, SRM 124 may set up the VOD session on a selected QAM channel. SRM 124 may, at stage 212 deliver DTA-ISK to QAM 116. QAM 116 may, at stage 214, use the DTA-ISK for encrypting the VOD content to be delivered to DTA 108. In addition, QAM 116 may send a join session request to video pump 120. Video pump 120, after receiving the join session request from QAM 116, may start streaming of the VOD content selected by the subscriber to QAM 116. After initiation of the streaming of the VOD content, QAM 116, at stage 220, may send a session notification to SRM 124. After receiving the session notification, SRM 124, at stage 222, may respond to client proxy service 114 with video pump 120 IP address, the tuning information and a VOD session ID. SRM 124 may respond to client proxy service 114 through a client session setup confirm (CSSC) message.

Client proxy service 114 may return video pump 120 IP address to DTA 108 to be used to source the VOD content. Client proxy service 114, at stage 224, may signal DTACS 122 to forward tuning AMM to DTA 108 for the selected content. DTASC 122 may forward the tuning AMM to DTA 108. If the DTA ID as obtained in the VOD selection request from the VOD application does not match with a DTA associated with the purchase token provided, client proxy service 114 may request that a new tuning AMM be created containing the DTA-ISK of the DTA associated with the purchase token. The tuning AMM, in turn, may be delivered to DTA 108 requesting the VOD session. The category of VOD request, as described in this case where the target DTA is not the one associated with the purchase token, may be referred to as a surrogate VOD request. This mechanism may enable a different subscriber to co-watch the same VOD content and stream the same VOD session to multiple DTA devices. This occurs only if the VOD session mapped to the purchase token already exists. The VOD request with a surrogate DTA identifier may choose to join an existing VOD session or create a new VOD session.

DTA 108 may be forced to tune to the selected channel, based on the information contained in tuning AMM. QAM 116, at stage 234, may start streaming the VOD content on the selected frequency to DTA 108. QAM 116 may encrypt the VOD content before streaming to DTA 108 using the DTA-ISK received from SRM 124. At the end of the streaming, QAM 116, at stage 234, may send a session end notification to SRM 124. SRM 124, after receiving the session end notification from QAM 116, may send a notification to DTACS 122 to end the VOD session. SRM 124 may issue the session end notification to client proxy service 114 when the VOD session is torn down, along with the DTA ID. The session end notification may be used by client proxy service 114 to determine the DTA devices associated with the VOD session and notify DTACS 122 to deliver a VOD session termination AMM to each DTA involved. Upon receiving the session termination AMM from DTACS 122, DTA 108 may exit out of the tuned VOD frequency, restore the encryption key to SCP global key or any other encryption key that it was previously using and go back to the last tuned broadcast service.

Consistent with embodiments of the disclosure, the subscriber may, using the application on handheld device 110, at stage 238, avail trick modes for the VOD session. The subscriber may order the trick modes using the purchase tokens. As an example, at stage 238, before or during the VOD session, the subscriber may request the trick modes for the VOD session on the VOD application from client proxy service 114. Client proxy service 114 may store video pump 120 information, such as protocol and endpoint information, against the session ID in its VOD session cache or may respond to the VOD application with the appropriate parameters related to VOD streamer control endpoint for trick modes. Client proxy service 114 may store the VOD streamer control endpoint information and may broker the session management (pause/play/resume/forward/rewind, etc.) request between the companion client device application and the VOD streamer. In alternate implementation where video pump 120 is accessible on public IP address, the companion client application may directly interact to video pump 120 for trick play. The VOD application thus may interact with video pump 120 either directly or via client proxy service 114 to control the given VOD session.

Consistent with embodiments of the disclosure, SRM 124 may return video pump 120 IP/address information as well as the RF tuning information. Client proxy service 114 may notify DTACS 122 using the Session-ID of the VOD session. DTACS 122 may query SRM 124 to obtain the RF QAM management port information to setup the AMM and EAS PID routes. Alternatively, the VOD RF channels may be prewired with the AMM and EAS PID routes via DTACS 122 configuration.

Consistent with embodiments of the disclosure, to enable tracking of VOD subscribers and support billing, client proxy service 114 may communicate with web service 132 to report the number of VOD sessions and a number of DTAs configured for VOD on each DTA control system. The report may facilitate multiple kinds of service billing models, such as billing based on the number of DTAs authorized for the VOD service, and billing based on a per VOD transaction basis.

To provide scalability, consistent with embodiments of the disclosure, client proxy service 114 may be distributed over multiple servers either as a virtual cloud service. In addition client proxy service 114 may be accessible over a web interface whose ingress data path may include addition of a load balancer component. Client proxy service 114 may be made available to the VOD application and accessible over the Internet 106, having initially been provisioned and discovered. In an example, client proxy service 114 may query a data store of client information (i.e. a client directory) to identify a control system element responsible for the management of DTA devices (i.e. a DTA control system), which is associated with the DTA under consideration. The control system agnostic approach may allow client proxy service 114 to scale independently of the DTA control systems to which it must interface.

Figure 3:
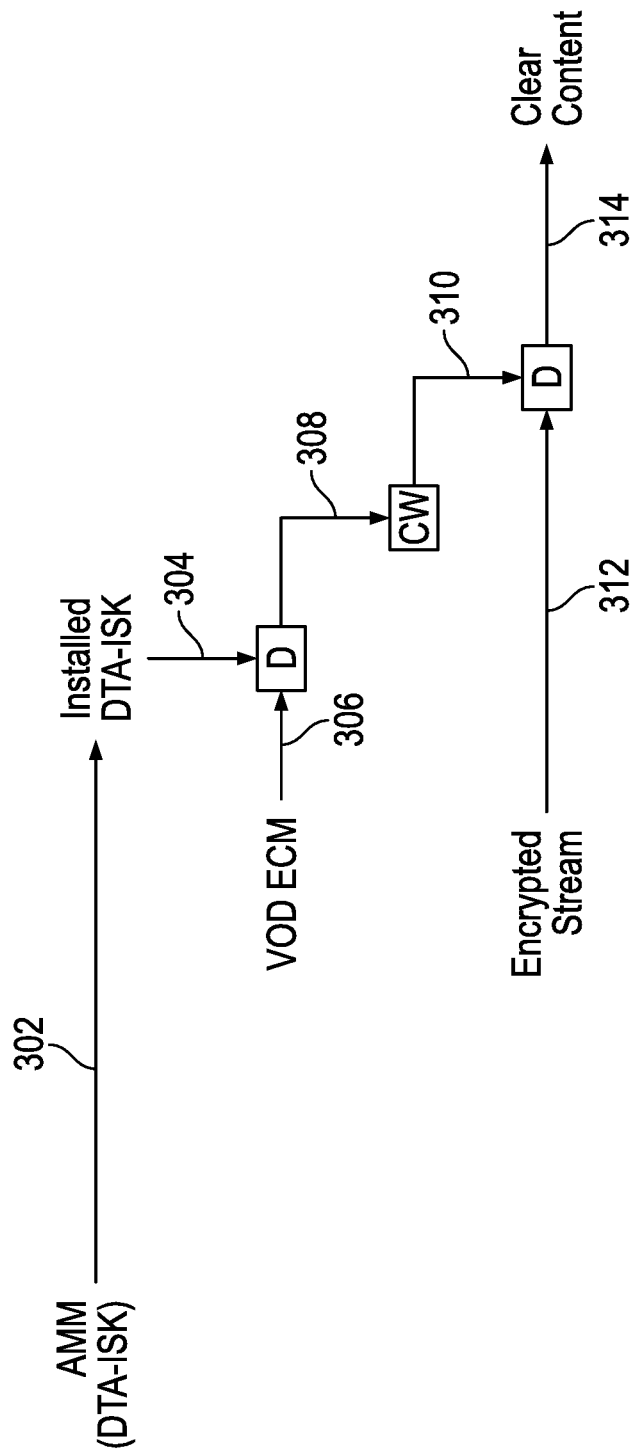
FIG. 3 illustrates a sequence diagram for decryption of the VOD content received on a DTA.

FIG. 3 illustrates a sequence diagram for decryption of the VOD content received on DTA 108 from QAM 116. As discussed above in reference to FIGS. 2A and 2B, DTA 108 may receive the security key, such as DTA-ISK, from DTASC 122. Security key may be a key similar in structure to an ISK (128 bits) to secure the VOD content in a 2-way network scenario. However, consistent with embodiments of the disclosure, the DTA-ISK may be a pre-generated symmetric key created when a given DTA device is authorized for the VOD service. The symmetric key may be delivered to DTA 108 via a control message (such as EMM). Further, the security key may be recycled by DTA 108 as required. DTA 108 may install the security key in system on chip (SOC), which may be an integrated chip.

In addition to the security key, DTA 108 may also receive entitlement control message (ECM) generated by DTASC 122 and forwarded to QAM 116 by SRM 124. The ECM may be, at stage 306, be forwarded to a first decryptor at DTA 108. At stage 304 the installed security key may be forwarded to the first decryptor as well. The first decryptor may, at stage 308, use the ECM and security key to generate a control word (CW). The generated CW, at stage 310 may be sent a second decryptor. The second decryptor, at stage 312, may also receive the encrypted VOD content. At stage 314, the second decryptor may use the CW to decode the encrypted VOD content to generate a clear content for the display device connected to DTA 108.

Figure 4:
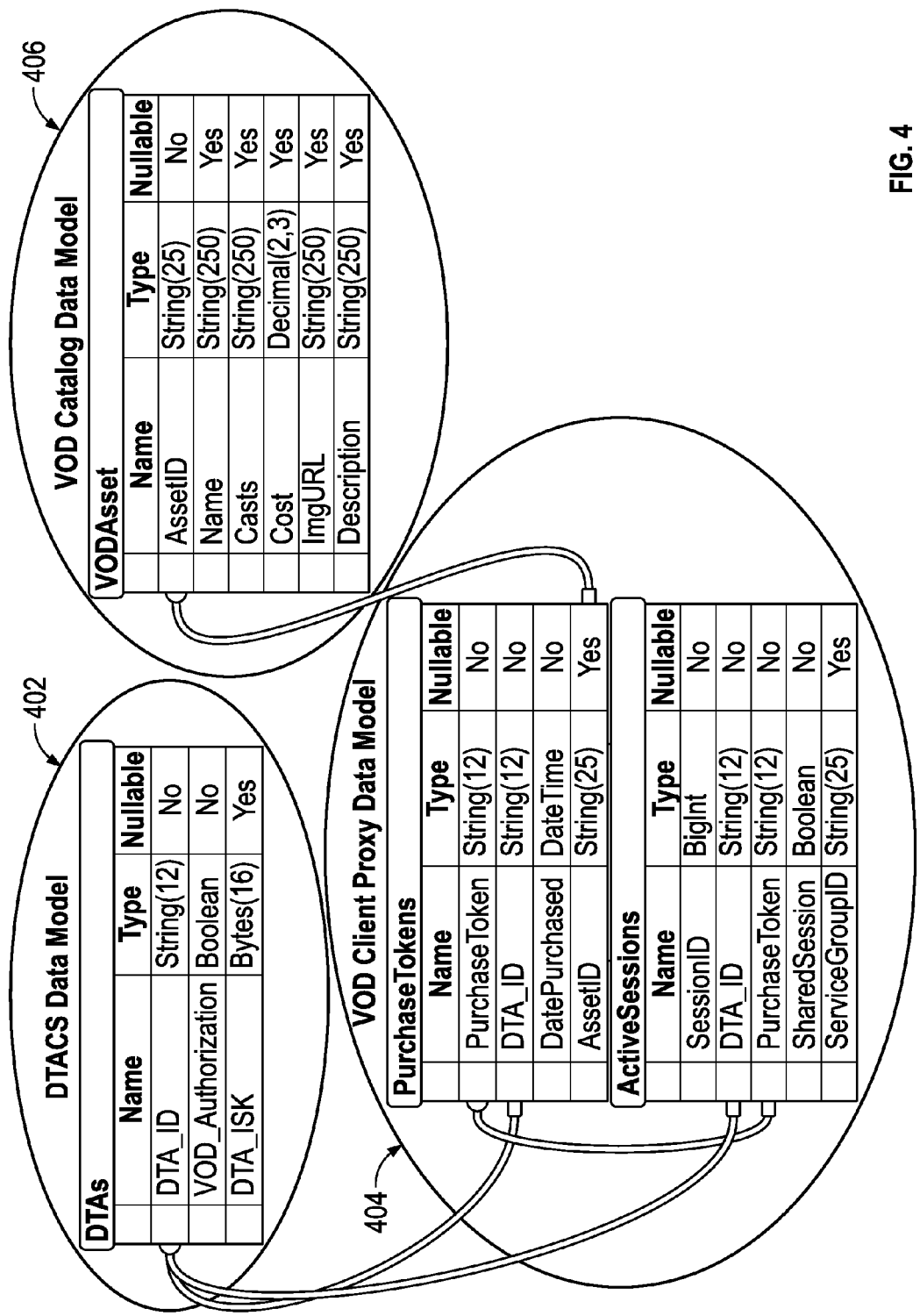
FIG. 4 is a is a diagram illustrating a data model for the VOD system.

FIG. 4 is a diagram illustrating a data model 400 for VOD system 100, showing various system components associated with managing the VOD service on DTA 108. Data model 400, as shown in FIG. 4 may include, a DTACS data model 402, a client proxy service data model 404, and a VOD catalog data model 406. The data model 400 may include models of the information exchanges in MSO 104.

Consistent with embodiments of the disclosure, the PurchaseToken construct defined in client proxy service data model 404 may be similar to a classic MAC address in structure. The concept may include this construct's unique generation and storage on a per VOD request basis on client proxy service 114. The abstraction provided by the PurchaseToken construct may enables multiple clients to share a common VOD session, which will be described in detail in the following parts of the disclosure.

Figure 5:
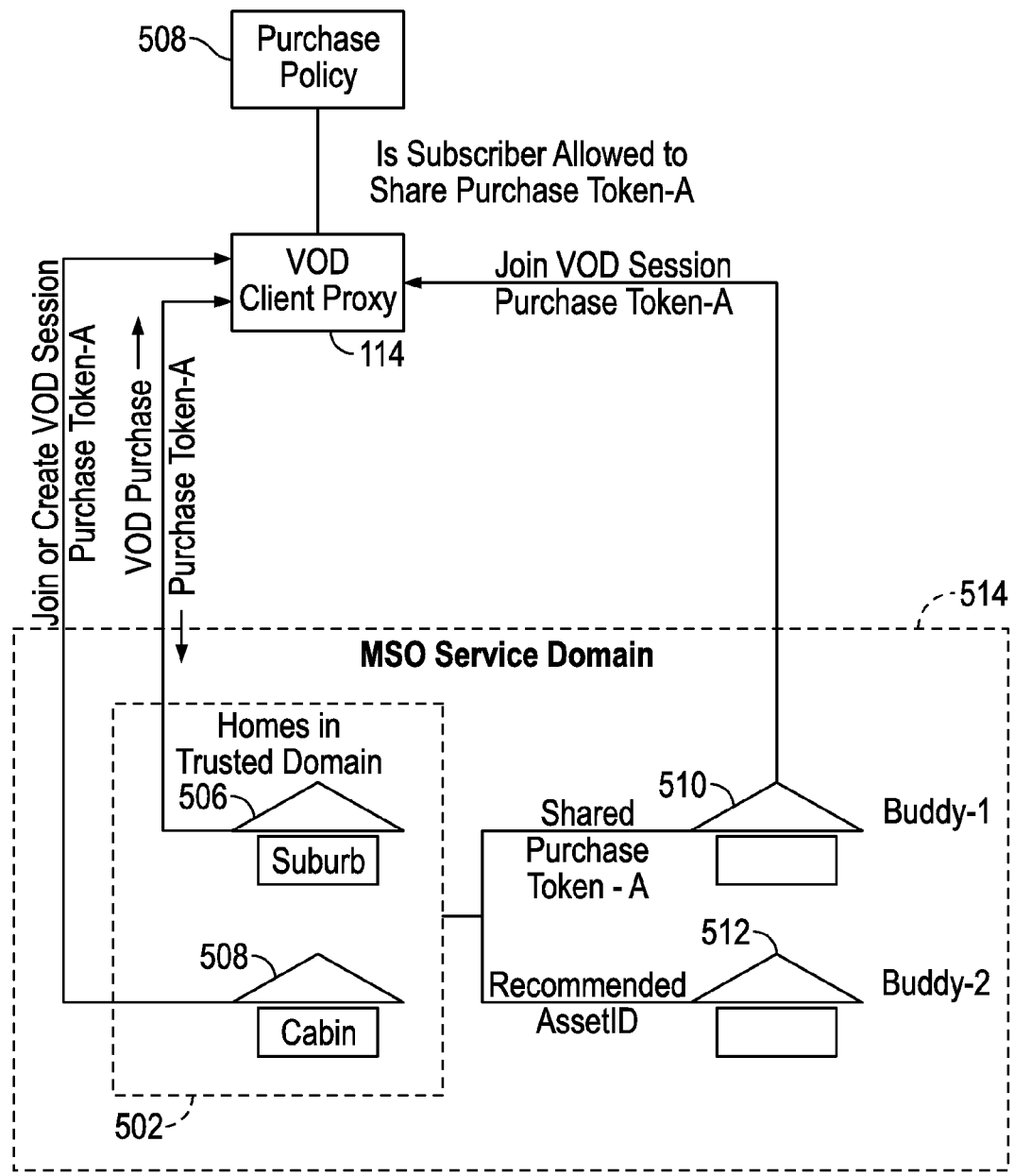
FIG. 5 is a diagram illustrating a VOD system for sharing the VOD session on multiple DTAs.

FIG. 5 illustrates a VOD system 500 for sharing a VOD session. FIG. 5 shows social collaboration elements involved in supporting the VOD session sharing using a VOD application. The purchase-token may be used as an abstraction to enable multiple users to share the VOD session, either as a shared session or as an exclusive VOD session (new session).

To facilitate the VOD session and content sharing, a notion of a trusted-domain 502 may be used. Trusted-domain 502 may include a subscriber's account within which there are multiple DTAs. An asset purchased by the subscriber, is associated with the account and may be made available on the multiple DTAs, such as a DTA in suburb 506 (DTA-1) and a DTA in cabin 508 (DTA-2) within trusted domain 502. For example, if content is purchased on DTA-1, but the subscriber may have more than one DTA (DTA-2) within the account.

The multiple DTAs that belong to the same subscriber account, within trusted domain 502, may have a need to stream the same VOD session over multiple screens simultaneously (such as when playing the content on multiple screens at a large venue). In such cases, the subscriber, using the VOD application, may request a VOD session specifying the AssetID on DTA-1. Client proxy service 114 may return a purchase-token generated when the VOD session purchase is completed. The subscriber using this purchase-token may request a session to be played on DTA-1 and DTA-2. For an active session, an established VOD session against the purchase-token streaming on any device, against a 'Purchase-token', the subscriber may be presented with an option to either join the existing VOD session in progress or create a new session. The option to join existing VOD session or create a new session may be governed by purchase policy engine 508. If client proxy service 114 determines that a target DTA is different than the DTAs associated with a source-DTA which initially purchased the VOD, then it may check with purchase policy engine 508 to determine, if it is ok to allow content access to the target-DTA. Purchase policy engine 508 functionality may integrate with subscriber account management system to determine if the target-DTA resides in trusted domain 502.

Once, it is determined that the target-DTA is allowed to stream an active session or content purchased by the source-DTA, an authorization message containing a source-DTA-ISK and tuning parameter may be delivered to the target-DTA. The target-DTA upon receiving the source-DTA-ISK may install the source-DTA-ISK in the SOC and tune to a specified frequency and program number. Consequently, the target DTA may be enabled to stream the VOD content purchased on the source-DTA.

When the target-DTA (such as DTAs at buddy-1 510 and buddy-2 512) does not reside within trusted-domain 502, the sharing of the VOD session may be supported by leveraging sharing of the purchase-token. The purchase token may be shared across subscribers within MSO service domain 514. The sharing of the purchase token may be supported by enabling instant messaging and roster's features in the VOD application. Where a subscriber is able to add another subscriber to her roster and during an ongoing VOD session, may provide metadata containing the purchase-token of a VOD content purchased by her to a buddy-subscriber in her roster. Appropriate policies or authorizations in place may be employed to enable a buddy to co-watch or separately stream the purchased asset on a buddy-subscriber's DTA.

Consistent with embodiments of the disclosure, the VOD application for VOD selection and VOD session control may support features such as: a mechanism to authenticate against a DTA VOD service, a mechanism to select a DTA device, a mechanism to retrieve a listing of active and previously purchased VOD contents associated with the subscriber's account, a mechanism to manage rosters, a mechanism to retrieve a catalog of VOD content, a mechanism to request a purchase of VOD asset, a mechanism to control active VOD sessions, a mechanism to share asset information with buddy-subscribers, a mechanism to share purchase-token with buddy-subscribers, a mechanism to exit from VOD session.

Methods and systems consistent with embodiments of the disclosure may enable generation of purchase token on the server side when a VOD asset is purchased on another CPE such as a STB or IP device within the trusted domain 502. In such a scenario, purchase policy 508 may process a notification from an external system (for e.g. from a pub-sub notification service identifying a subscriber account and VOD AssetID). Purchase Policy 508 may further query a subscriber account management to obtain a list of DTA devices and requests client proxy service 114 to generate the purchase token, which may later show up in a purchased VOD content listing within the VOD application on handheld device 110. This mechanism may also enable the VOD purchased on a STB to become accessible on DTA 108 and vice versa.

Figure 6:
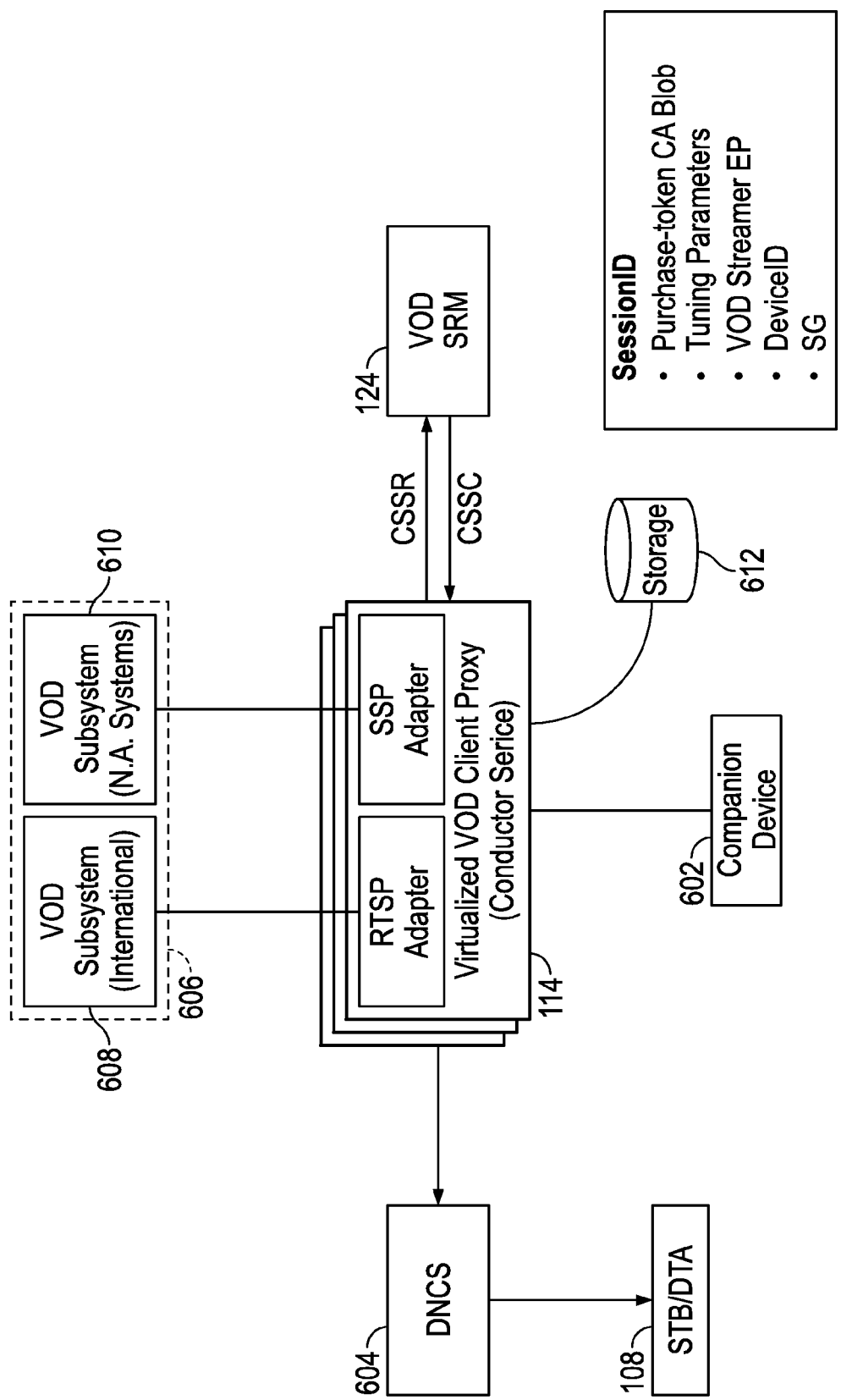
FIG. 6 is a diagram illustrating a conditional access systems (CAS) in VOD service environment.

FIG. 6 illustrates a block diagram showing conditional access systems (CAS) abstracting a purchase token. Conditional access may comprise any access control scheme whether implemented in hardware, software, or firmware. This may be implemented using, for example, CA-specific hardware/software elements embedded in the device, such a plug-in security module access technology, a downloadable CA system (DCAS), or otherwise.

Abstracting a purchase token may be introduced to enable multiple CA systems support in VOD service environment. In addition, the purchase token feature may allow the VOD sessions to be co-watched (session simultaneously streamed to multiple DTAs) on devices supporting same or different CA systems. As discussed above, since the one-way device, such as a DTA, may not provide a reverse path, client proxy services 114 located in the cloud may provide this functionality through a VOD application running on a companion device. After receiving a VOD session request from the VOD application, client proxy services 114 may be send a request to SRM 124 for setting up of the VOD session and may receive a response from SRM 124 once the session has been setup. The following messages may be exchanges between client proxy service 114 and SRM 124 during the VOD session setup:

| | |
|---|---|
| ClientSessionSetUpRequest | Client Proxy Service => SRM |
| ClientSessionSetUpConfirm | SRM => Client Proxy Service |

Upon a ClientSessionSetupConfirm, client proxy service 114 may extract the VOD session tuning parameter from this message and use value added service provider (VASP) service on the digital network control system (DNCS) to send a PassThru tuning message. Client proxy service 114 may also store video pump 120 information, i.e. protocol and endpoint information so that subsequent requests from a companion client application (either over XMPP or HTTP) for the session or for trick modes may also be handled via client proxy service 114. In an alternate implementation where video pump 120 is accessible on public IP address, the VOD application may directly interact with video pump 120 for trick play. The sharing of VOD sessions on the CAS is described in more detail in following parts of the disclosure. Detail formats for the messages are provided in later part of the disclosure.

Figure 7:
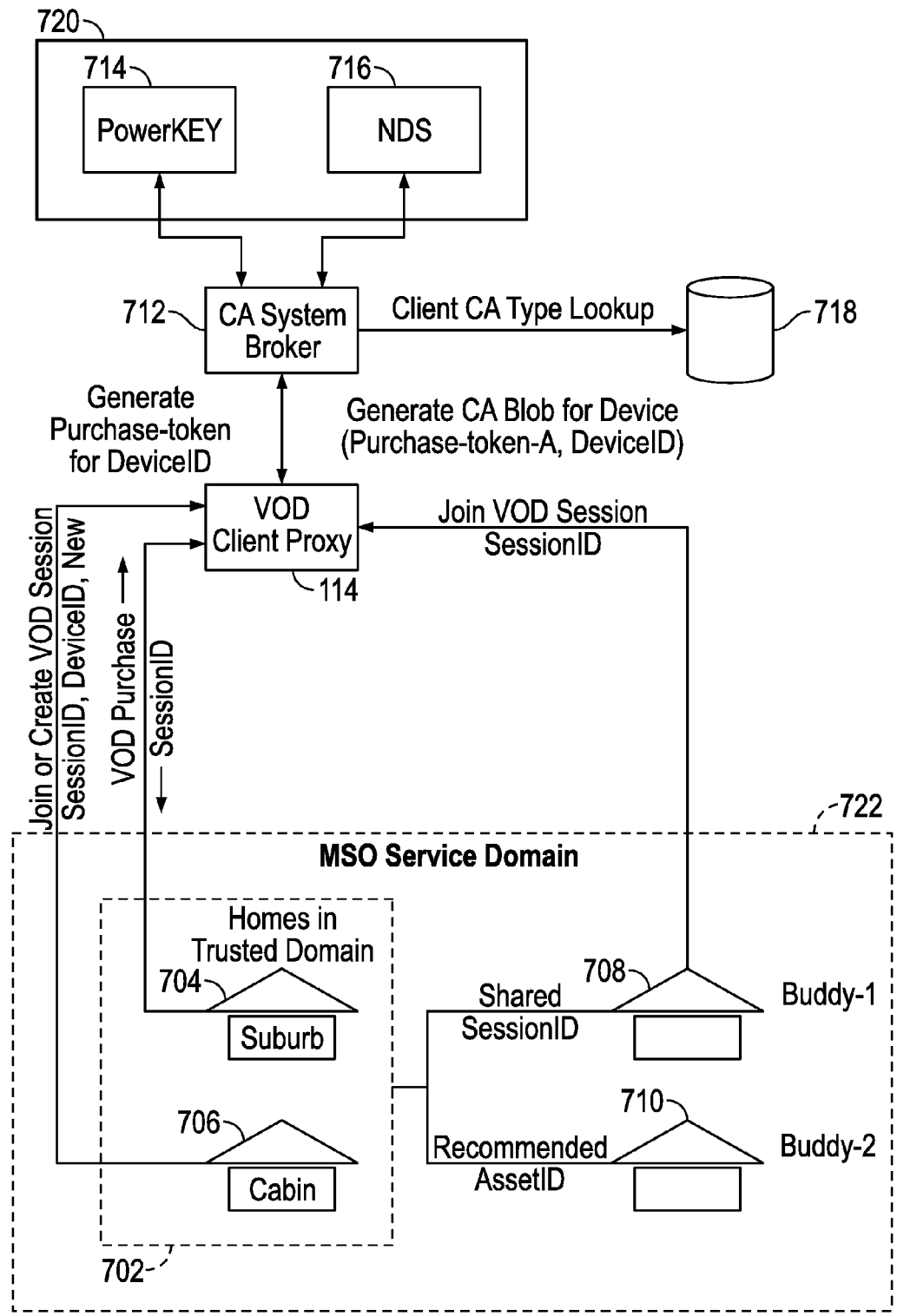
FIG. 7 is a diagram illustrating a VOD system for sharing of VOD sessions on conditional access systems (CAS)

FIG. 7 is a diagram illustrating a VOD system 700 for sharing of VOD sessions on conditional access systems (CAS). A VOD application running on a companion device residing in subscriber premise 702, may initiate a VOD session request. The VOD session request may include details of a first DTA 704 which may be located inside subscriber premise 702. The details may include an AssetID, service group ID (SGID) and a device ID of first DTA 704. The AssetID may uniquely identify the VOD Asset, such as DTA 704, to client proxy service 114.

Client proxy service 114 upon receiving the VOD session setup request from the VOD application may create a DSMCC message (i.e. ClientSessionSetupRequest). The DSMCC message may identify that client proxy service 114 may need to generate a purchase token CA blob instead of a device ISK key. Client proxy service 114 may communicate with SRM 124 and request for session details.

SRM 124 may communicate with a VOD subsystem (not shown) to determine if the VOD content requested by the subscriber needs to be encrypted. If the VOD content needs to be encrypted, SRM 124 may communicate with CA system broker 712 to obtain a purchase token (for example, over OCAIvX). Alternatively, client proxy service 114 may also communicate with CA system broker 712 to request for the purchase-token. CA system broker 712 may request CA system 720 (such as PowerKey 714 and NDS 716) to generate a purchase token encapsulated with CA system public key. CA system broker 712 may also perform a look up in a storage device 718 and find a CA type associated with first DTA 704 based on its DTA ID. CA system broker 712, after the look up 718, may communicate with an appropriate CA system 720 to obtain the purchase token.

The purchase-token, for example one obtained in Power-KEY 714 environment, may be a 128 bit ISK encrypted by the public key of a CA system 720. The purchase token may be an opaque data that may represent an ISK unlocking key. The purchase token may only be accessible in un-encrypted format inside SOC or the hardware security module (HSM) of an associated CA system. The purchase token may additionally include a prefix, identifying CA system 720 (either PowerKey 714 or NDS 716), to provide routing for later device-ISK generation calls based on the purchase-token.

CA system broker 712 may provide the CA blob with the purchase token to SRM 124. SRM 124 may set up the VOD session using an appropriate QAM encryption mechanism. SRM 124 may also get the ISK encrypted for the appropriate QAM and deliver to the appropriate QAM to start the VOD session encryption. SRM 124 may respond to client proxy service 114 with the purchase token.

Client proxy service 114 may use the deviceID and communicate directly with CA system broker 712 to request for a device-ISK blob. Client proxy service 124 may pass the purchase token to CA system broker 712. CA system broker 712 may determine the CA system 720 and pass the purchase token and the deviceID to request for the appropriate ISK encrypted with the device's public key. To generate the device ISK, the CA system 720 may first decrypt the purchase-token to obtain ISK in clear using its private key within the HSM/SOC and then re-encrypt the ISK with the public key of the device. If CA system 720 is for the device is determined to be different from the CA system 720 in the purchase-token. CA system 720 may broker with SRM 124 to setup a Simulcrypt on a pre-existing session and may deliver this session specific CA blob back to client proxy service 114. Client proxy service 114 may use the DSMCC PassThru or some other mechanism to deliver a CA key to a target DTA. The device-ISK may be delivered back to client proxy service 114 in the ClientSessionSetupConfirm message, which in turn may make a DSMCC PassThru request (in case of PowerKEY devices) to a DNCS after extracting the CA and tuning parameters.

Client proxy service 114 may store VOD streamer endpoint information against a session ID in its VOD session cache.

Client proxy service 114 may respond to the VOD application with appropriate parameters related to the VOD streamer control endpoint for trick modes. Client proxy service 114 may store the VOD streamer control endpoint information and brokers session management (pause/play/resume/forward/rewind etc.) requests between the VOD application and the VOD streamer.

The subscriber using the VOD application may share the session ID with another buddy whom he wants to watch the VOD session with or use the session ID to launch the VOD session on a second CPE device (such as second DTA 706), which may be located in customer premise 702. In this case the subscriber will share the sessionID with a buddy (such as buddy-1 708 and buddy-2 710) or select a different device (i.e. DTA 706) and make a VOD session request with the session ID and deviceID of the selected buddy or the different device. In such case as defined in, client proxy service 114 upon receiving a session setup request from a different deviceID than the one which was used to setup/purchase the VOD session, may communicate with policy/account service to determine if a session request should be granted.

Upon confirmation from the policy/account service that the session requested may be granted, client proxy service 114 may request CA system broker 712 with purchase-token and the deviceID of DTA 706 to obtain the device-ISK for DTA 706. CA system broker 712 may obtain a CA blob for DTA 706. Once the CA blob for DTA 706 is obtained, client proxy service 114 may deliver the CA blob and tuning parameters to DTA 706 using the PassThru interface on control system. Client proxy service 114 may further identify to a VOD application associated with DTA 706, the VOD session is in control of the VOD application associated with DTA 704. Client proxy service 114 may also notify VOD application associated with DTA 704 that DTA 706 has joined the VOD session. If same subscriber is launching the service on another DTA, such as on DTA 706, the VOD application associated with DTA 704 may retain a control for the share VOD session. The subscriber may transfer trick-mode control to the VOD application associated with DTA 706 mediated via client proxy service 114.

According to embodiments of the disclosure, the ClientSessionSetupRequest message and ClientSessionSetupResponse messages may include a flag indicating that a purchase token for use by client proxy service 114 has to be generated instead of the device specific CA blob. The inclusion of a flag may not require any changes to the message structure as network service access point (NSAP) in the ClientSessionSetupRequest message, and may be used to identify CA system 720 and treat it as special case.

Figure 8:
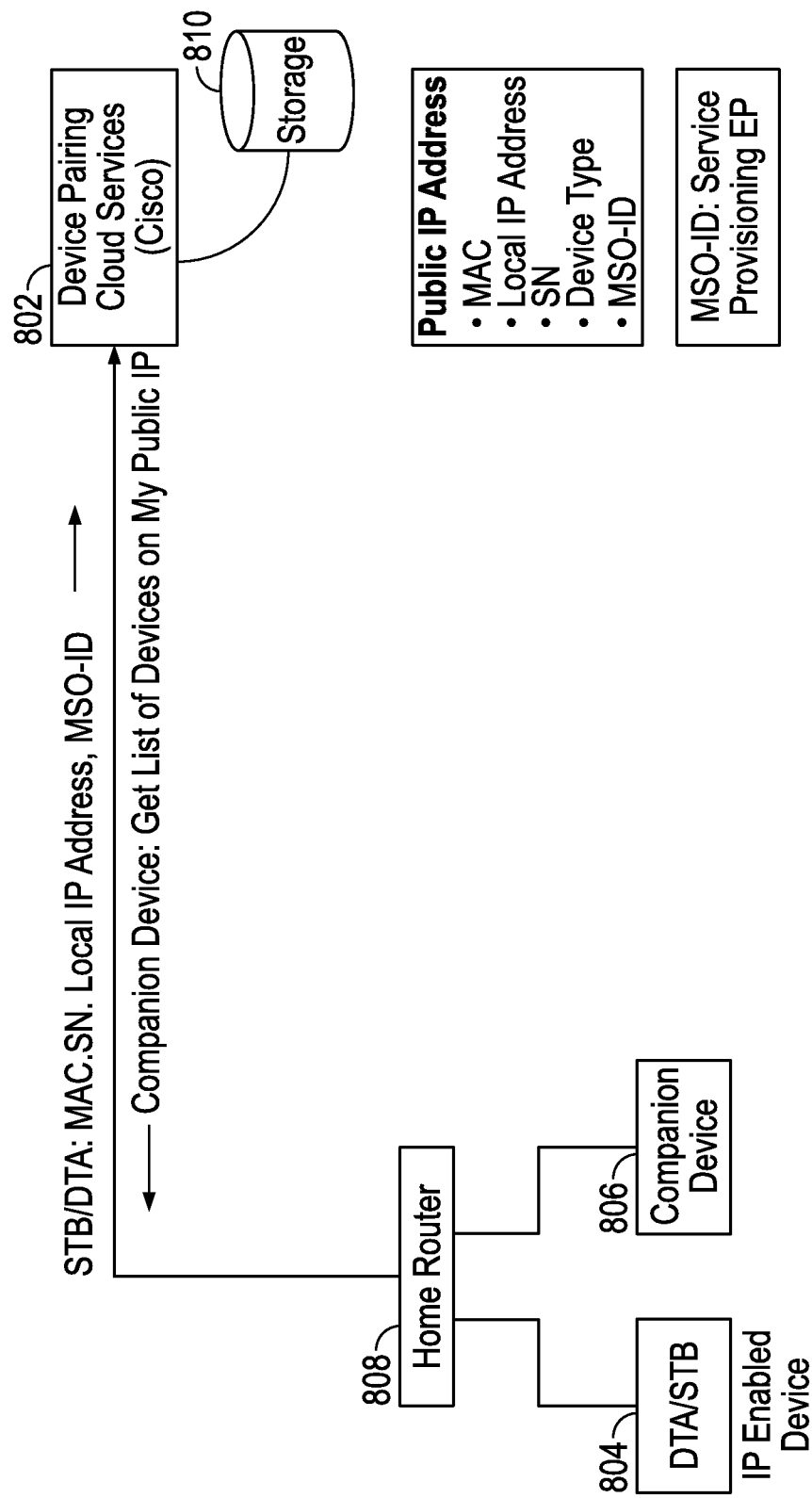
FIG. 8 is a diagram illustrating a system for discovery and pairing of a VOD application running on a handheld device with a DTA.

FIG. 8 illustrates a system 800 for discovery and pairing of a VOD application running on a handheld device with a DTA 804. FIG. 8 is shown to include overview of how the pairing of the DTA 804 to obtain a service group, MSO 104 specific client proxy service 114 endpoint and other information may be obtained.

For DTA 804, which support Ethernet, may send a low bandwidth UDP message containing MAC, local IP address, serial number (SN), a device type and a MSO-ID to a device pairing cloud service 802 at a public endpoint on the Internet 106. Device pairing cloud service 802 may obtain public IP address for DTA 804 from the UDP message header and store in data store 810. When companion device 806 connects to device pairing cloud service 802 to ask for list of the devices found on the same public IP, device pairing cloud service 802 may be able to provide the list of devices behind the public IP, by checking data store 810. If there is more than one device behind the public IP, then the VOD application user may be asked to select an appropriate device from a list. Using the MSO ID obtained, device pairing cloud service 802 may configure companion device 806 VOD application to connect to MSO's service on the Internet that provides client proxy functionality.

For DTA 804, which may not support Ethernet, when companion device 806 is unable to obtain a list of devices from device discovery cloud service 802, VOD application may ask the user to select a MSO. Once the MSO is selected, the user may authenticate on the MSO network to obtain the list of DTAs associated with the user's account.

For DTA 804, which does not support both IP as well as non-IP (such as one way DTA), after the auto discovery of the MSO service endpoint and MSO authentication the list of devices may be obtained from the MSO headend.

Consistent with embodiments of the disclosure, MSO may be discovered for a DTA by using location services. The location services may be along with concave polygon algorithms to narrow down a MSO list. Most handheld devices, such as companion device 806, may provide mechanism to determine a GPS location when location services are enabled. The GPS location provided by the location services may be used to build a concave polygon on device-discover/pairing cloud service 810 based on information obtained from IP-enabled DTA and successfully paired non-IP device to build geographic area served by each MSO. Once this concave polygon is constructed, the VOD application may use the location information of companion device 806 to determine the MSO serving the geographic region.

While described generally in the context of a network providing service to a consumer (i.e., home) end user domain, the present disclosure may be readily adapted to other types of environments including, e.g., commercial/enterprise, and government/military applications. Myriad other applications are possible. Moreover, while generally described in terms of content delivery over discrete QAMs or channels, relevant portions of the disclosure can be used in conjunction with multiplexing algorithm and wideband tuner apparatus.

Embodiments of the disclosure, for example, may be implemented as a computer process (method), a computing system, or as an article of manufacture, such as a computer program product or computer readable media. The computer program product may be a computer storage media readable by a computer system and encoding a computer program of instructions for executing a computer process. The computer program product may also be a propagated signal on a carrier readable by a computing system and encoding a computer program of instructions for executing a computer process. Accordingly, the present disclosure may be embodied in hardware and/or in software (including firmware, resident software, micro-code, etc.). In other words, embodiments of the present disclosure may take the form of a computer program product on a computer-usable or computer-readable storage medium having computer-usable or computer-readable program code embodied in the medium for use by or in connection with an instruction execution system. A computer-usable or computer-readable medium may be any medium that can contain, store, communicate, propagate, or transport the program for use by or in connection with the instruction execution system, apparatus, or device.

The computer-usable or computer-readable medium may be, for example but not limited to, an electronic, magnetic, optical, electromagnetic, infrared, or semiconductor system, apparatus, device, or propagation medium. More specific computer-readable medium examples (a non-exhaustive list), the computer-readable medium may include the following: an electrical connection having one or more wires, a portable computer diskette, a random access memory (RAM), a read-only memory (ROM), an erasable programmable read-only memory (EPROM or Flash memory), an optical fiber, and a portable compact disc read-only memory (CD-ROM). Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

Embodiments of the present disclosure, for example, are described above with reference to block diagrams and/or operational illustrations of methods, systems, and computer program products according to embodiments of the disclosure. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

While certain embodiments of the disclosure have been described, other embodiments may exist. Furthermore, although embodiments of the present disclosure have been described as being associated with data stored in memory and other storage mediums, data can also be stored on or read from other types of computer-readable media, such as secondary storage devices, like hard disks, floppy disks, or a CD-ROM, a carrier wave from the Internet, or other forms of RAM or ROM. Further, the disclosed methods' stages may be modified in any manner, including by reordering stages and/or inserting or deleting stages, without departing from the disclosure.

While the specification includes examples, the disclosure's scope is indicated by the following claims. Furthermore, while the specification has been described in language specific to structural features and/or methodological acts, the claims are not limited to the features or acts described above. Rather, the specific features and acts described above are disclosed as example for embodiments of the disclosure.

What is claimed is:

1. A method comprising:
   receiving, at a multi system operator (MSO), a request from a companion device for a video-on-demand (VOD) session, the request comprising a subscriber identity (ID);
   sending, at the MSO and in response to the received request for the VOD session, a catalog of VOD content to the companion device;
   receiving, at the MSO, a selection of VOD content listed in the catalog of VOD content from the companion device;
   identifying, at the MSO, a plurality of digital transport adaptors (DTAs) within a trusted-domain associated with the subscriber ID received in the request for the VOD session;
   receiving, at a Client Proxy service on the MSO, a selection of a first DTA from the plurality of identified DTAs within the trusted-domain associated with the subscriber ID;
   generating, at the Client Proxy service on the MSO and in response to receiving the selection of the first DTA from the plurality of DTAs within the trusted-domain associated with the subscriber ID, a unique purchase token for the selected VOD content and the first DTA;
   setting up the VOD session with the first DTA and a second DTA, at the Client Proxy service on the MSO, wherein the first DTA and the second DTA both comprise one-way communication devices operated to only process data received on a down-stream data path from a headend and not enabled to communicate with external devices, wherein the setting up the VOD session comprises,
   identifying the first DTA from the unique purchase token;
   identifying the second DTA from a request of the VOD session from the companion device and as being within the trusted-domain, and providing an up-stream data path from the identified first DTA to the headend via the companion device; and
   streaming simultaneously the selected VOD content to the first DTA and the second DTA.

2. The method of claim 1, wherein receiving from the companion device comprises receiving from the companion device comprising one of the following:
   a smartphone, a tablet device, a handheld device, and a personal computer (PC).

3. The method of claim 1, wherein sending the catalog of VOD content to the companion device comprises sending the catalogue of VOD content to an application running on the companion device.

4. The method of claim 1, wherein receiving the selection of VOD content listed in the catalogue of VOD content comprises receiving the selection at the client proxy service on the multi system operator.

5. The method of claim 1, wherein setting up the VOD session comprises sending instructions to a headend device to set up the VOD session comprising:
   performing a geocode mapping for the first DTA;
   identifying the headend device based on the geocode mapping; and
   sending to the identified headend a first DTA identifier corresponding to the first DTA.

6. The method of claim 1, wherein setting up the VOD session comprises sending instructions to a headend device to set up the VOD session comprising:
   determining when the first DTA is authorized for the VOD session; and
   sending, to the companion device, a notification when the first DTA is authorized.

7. The method of claim 1, further comprising sending billing information for the selected VOD content.

8. The method of claim 1, further comprising sending billing information for the selected VOD content to the companion device.

9. The method of claim 1, further comprising:
   generating a symmetric encryption and decryption key; and
   sending the generated symmetric encryption and decryption key to the first DTA for decrypting the selected VOD content.

10. A method comprising:
    sending, from a companion device, a request for a video-on-demand (VOD) session, the request comprising a subscriber identity (ID);
    receiving at the companion device, in response to the sent request for the VOD session, a catalog of VOD content;
    sending, from the companion device, a selection of a VOD content listed in the catalog of VOD content;
    identifying, by the companion device, a plurality of digital transport adaptors (DTAs) associated with the subscriber ID, the plurality of DTAs being within a trusted-domain;
    sending from the companion device a selection of a first DTA from the plurality of DTAs being within the trusted-domain at which the selected VOD content is to be received, wherein the selected first DTA is a one-way communication device operated to only process data received on a down-stream data path from a headend and not enabled to communicate with external devices;

receiving at the companion device a unique purchase token for the selected VOD content and the first DTA;

requesting from the companion device the VOD session on a second DTA from the plurality of DTAs being within the trusted-domain from the companion device using the received unique purchase token;

receiving a setup of the VOD session at the first DTA and the second DTA, wherein the second DTA is a one-way communication device operated to only process data received on a down-stream data path from a headend and not enabled to communicate with external devices, wherein receiving the set-up of the VOD session further comprises receiving the setup for an up-stream data path from the first DTA to the headend via the companion device; and receiving simultaneously the selected VOD content at the first DTA and the second DTA through the VOD session.

11. The method of claim 1, further comprising:

receiving another request from the companion device for a concurrent VOD session on the second DTA using the unique purchase token;

setting up the concurrent VOD session with the second DTA.

12. The method of claim 1, further comprising:

receiving another request from the companion device for sharing the unique purchase token with another DTA; and sending the unique token to another companion device associated with the another DTA.

13. The method of claim 10, further comprising receiving billing information for the selected VOD content at the companion device.

14. The method of claim 10, wherein sending from the companion device comprises sending from the companion device comprising one of the following: a smartphone, a tablet device, a handheld device, and a personal computer (PC).

15. The method of claim 10, wherein receiving the catalog of VOD content comprises receiving the catalogue of VOD content at an application running on the companion device.

16. The method of claim 15, further comprising displaying the catalog on the companion device.

17. The method of claim 10, wherein sending the selection of VOD content listed in the catalog of VOD content comprises sending the selection to a proxy service on a multi system operator.

18. The method of claim 10, wherein receiving the setup of the VOD session at the selected first DTA comprises receiving the setup from a multi system operator (MSO).

19. The method of claim 10, wherein receiving the selected VOD content at the selected first DTA through the VOD session comprises receiving the selected VOD content from a multi system operator (MSO) operated to supply the selected VOD content.

20. An apparatus comprising:
a memory storage; and
a processing circuitry coupled to the memory storage, wherein the processing circuitry is operative to:
receive a request for a video on demand (VOD) session from a companion device, the request including a subscriber identity (ID);
determine, based on the subscriber ID, a catalog of VOD content available to a subscriber associated with the subscriber ID;
send the catalog of VOD content to the companion device;
receive a selection, from the companion device, of a VOD content from the catalog of VOD content;
identify a plurality of digital transport adaptors (DTAs) associated with the subscriber ID, the plurality of DTAs being within a trusted-domain;
receive, from the companion device, a selection of a first DTA from the plurality of DTAs where the selected VOD content is to be delivered, wherein the first DTA is a one-way communication device operated to only process data received on a down-stream data path from a headend and not enabled to communicate with external devices;
generate a unique purchase token for the selected VOD content and the first DTA;
set-up the VOD session with the selected first DTA, wherein the processing circuitry operative to set-up the VOD session with the first DTA comprises the processing unit is operative to:
identify the first DTA from the unique purchase token,
identify a second DTA from the request of the VOD session from the companion device and as being within the trusted-domain, and set-up an up-stream data path from the identified first DTA to the headend via the companion device;
generate a first DTA specific encryption and decryption key specific for the first DTA; and
send the first DTA specific encryption and decryption key to the first DTA.

21. The apparatus of claim 20, wherein, the processing unit is further operative to:
identify a headend device based on a location of the first DTA, and
send an instruction to the identified headend device to:
set up the VOD session with the first DTA;
tune the first DTA to a selected frequency; and
stream, by the headend device, the selected VOD content on the selected frequency to the first DTA for display.

22. The apparatus of claim 21, wherein the processing unit is further operative to send instructions to the identified headend at the end of the VOD session to terminate the VOD session and free up the selected frequency.

23. The apparatus of claim 20, wherein the companion device is a mobile computing device having wireless connectivity to an Internet Protocol (IP) network.

24. The apparatus of claim 20, wherein the processing unit is operative to function in a cloud based environment.

* * * * *